United States Patent [19]

Maley

[11] 3,735,105

[45] May 22, 1973

[54] ERROR CORRECTING SYSTEM AND METHOD FOR MONOLITHIC MEMORIES

[75] Inventor: Gerald A. Maley, Fishkill, N.Y.

[73] Assignee: International Business Machines Corporation, Armonk, N.Y.

[22] Filed: June 11, 1971

[21] Appl. No.: 152,324

[52] U.S. Cl.......235/153 AC, 235/153 AK, 324/73 R

[51] Int. Cl...........................G11c 29/00, G06f 11/10

[58] Field of Search....................................340/172.5; 235/153 AC, 153 AM, 153 AK; 324/73 R

[56] References Cited

UNITED STATES PATENTS

| | | | |
|---|---|---|---|
| 3,631,229 | 12/1971 | Bems et al. | 235/153 |
| 3,222,653 | 12/1965 | Rice | 340/172.5 |
| 3,353,669 | 11/1967 | Broderick et al. | 324/73 R |
| 3,492,572 | 1/1970 | Jones et al. | 324/73 R |
| 3,546,582 | 12/1970 | Barnard et al. | 324/73 R |

*Primary Examiner*—Charles E. Atkinson

*Attorney*—Theodore E. Galanthay and Hanifin and Jancin

[57] ABSTRACT

A memory correcting system in accordance with this disclosure is an integral part of a digital electronic computer having a monolithic memory. The memory correcting system detects, records and analyzes errors occurring during normal operation of the computer. Also, the memory correcting system systematically addresses the monolithic memory on a cycle stealing basis monitoring the general health of the monolithic memory. The systematic reading and writing of all monolithic memory locations prevents the accumulating effects of random errors. By detecting single errors as rapidly as possible, the probability of acquiring additional errors that are above the correcting capabilities of the redundancy code are avoided.

26 Claims, 7 Drawing Figures

INVENTOR
GERALD A. MALEY
BY Theodore E. Galanthay
ATTORNEY

| BIT POSITIONS | C1 | C2 | D3 | C4 | D5 | D6 | D7 |
|---|---|---|---|---|---|---|---|
| CORRECT DATA WORD (WITH CHECK BITS) | 0 | 1 | 1 | 0 | 0 | 1 | 1 |
| SAMPLE ERRORED DATA WORD (WITH CHECK BITS) | 0 | 1 | 0 | 0 | 0 | 1 | 1 |
| REGENERATE CHECK BITS | 1 | 0 | | 0 | | | |
| COMPARE OLD CHECK BITS WITH NEW (DECODE INPUT) | 1 | 1 | | 0 | | | |
| (DECODE: POSITION 3 IS IN ERROR) (DECODE OUTPUT) | 0 | 0 | 1 | 0 | 0 | 0 | 0 |
| CORRECTED WORD | 0 | 1 | (1) | 0 | 0 | 1 | 1 |

ERROR CORRECTING SYSTEM AND METHOD FOR MONOLITHIC MEMORIES

CROSS REFERENCE TO RELATED APPLICATION OR PATENTS

U. S. Pat. No. 3,508,209, Agusta et al. assigned to the assignee of the present application.

BACKGROUND OF THE INVENTION

1. Field of the Invention

This invention relates to an error-correcting system and method for monolithic memories. More specifically, this invention relates to the checking and correcting of data stored in monolithic memories on a cycle-stealing basis during intervals when the memory is otherwise not busy.

2. Description of the Prior Art

There are fundamental distinctions in the structure and operation of monolithic memories from conventional core, disk, and drum memories. As an example, when a word is stored away in core, it can be assumed that it is free from accumulating random errors until it is read out. The information is locked in the magnetic field of the core. But, monolithic memories can accumulate random errors in words that are not being addressed. A line surge can flip a storage latch or a defective latch can slowly reset itself to zero when the machine is idle or running. Unlike the core, disk or drum memories, therefore, monolithic memories acquire errors as a function of time. That is, the probability of an error in a row of latches is much higher after a given interval of time than it is immediately after writing. Furthermore, the longer a word sets in memory, the higher will be the probability that it has acquired more than one error. Thus, it is vital that a single error in memory be corrected as rapidly as possible, so as to reduce the probability of acquiring additional errors that are above the correcting capabilities of an error-correcting code. Another distinction between core and monolithic memories, is that in core memories a word is destroyed by the act of reading. Thus, it makes little sense to read a word from core merely to see if it is correct, for it would have to be written back again, and one could question the reliability of this second write operation. But with a monolithic memory, the stored word is not destroyed by the read operation. A read operation is a looking at the settings of the latches without destroying the stored data. Moreover, in some types of monolithic memory, the act of reading regenerates the cell. In the prior art, error-detecting systems and methods have been tailored to core, disk, and drum type memories. For this reason, the only words read from memory were those required by the running program. Accordingly, no system or method for systematically detecting and correcting errors in memory was developed.

SUMMARY OF THE INVENTION

It is, therefore, a primary object of this invention to detect and correct errors in monolithic memories.

It is another object of this invention to systematically monitor a monolithic memory during intervals when it is not required by the remainder of the computer.

It is a further object of this invention to provide online error detection and correction.

In accordance with this invention, a memory-correcting system is provided as an integral part of an electronic digital computer. In the preferred embodiment, the memory-correcting system is implemented in hardware. It is, of course, recognized that the same functions could be performed by a portion of the main computer by means of appropriate programs. The memory correcting system is particularly adapted to detect and correct errors in monolithic memories. The memory-correcting system determines the health of the monolithic memory and preserves the stored data. This is important because as the size of monolithic memories increases, a particular data word may not be addressed for possibly a period of weeks and noise, for example, could introduce random errors. Additionally, it is important to detect faulty circuits containing a stuck bit or other types of permanent damage which should be repaired before a second error is introduced into the same word, potentially resulting in a catastrophic failure. Also, in some types of monolithic memories, the act of reading regenerates the memory cells, preventing the accumulation of errors.

The memory correcting system includes circuits for detecting when the memory is not busy or when a parity error has been corrected during the operation of the main program. In the first instance when the memory is not busy, the memory correcting system includes means for sequentially addressing the monolithic memory. The addressing means can be as simple as a counter which sequentially addresses the various addresses on a given chip, module, etc. or it can be a sophisticated program controlled address generator. Under the second of the circumstances, when an error is detected during the operation of the main program, the data and its corresponding address are gated into the memory correcting system. The memory correcting system includes recording means for recording all errored data and corresponding addresses. In its simplest form then, the counter steps through the monolithic memory, reading each successive location and errored data with their addresses are recorded together with errored data and addresses uncovered during the operation of the main program. The systematic addressing of memory is performed only on a cycle-stealing basis, that is, read cycles are initiated only when the memory is not being used by some other part of the computer. The mere periodic reading and writing of all memory locations eliminates the accumulation of those errors that will occur over a period of time. If, during the sequential reading of the memory an error is detected, the information is corrected and rewritten into memory correctly. In a more sophisticated embodiment, the memory correcting system includes a minicomputer so that errors are not only detected, but also recorded and corrected. The mini-computer is a computer within the computer that can analyze the cause of errors and proceed with subroutines of its own for a detailed diagnosis of the health of the monolithic memory. In this more sophisticated embodiment, the memory correcting system includes diagnostic circuits operating independently of the main program being processed by the central processing unit (CPU) and input output (I/O) devices. This also permits assigning a higher priority to the memory correcting system at times when such is needed for the correction of a particular word even to the point of interrupting the main program. If it should happen that a word and particular address is required by the CPU while it is also being checked by the memory correcting system, no conflict results since read-out is on a non-destructive basis and a copy of the word being worked on is always left in memory.

The foregoing and others objects, features and advantages of this invention will be apparent from the following and more particular description of preferred embodiments of the invention, as illustrated in the accompanying drawings.

DESCRIPTION OF THE PREFERRED EMBODIMENTS

Figure 1:
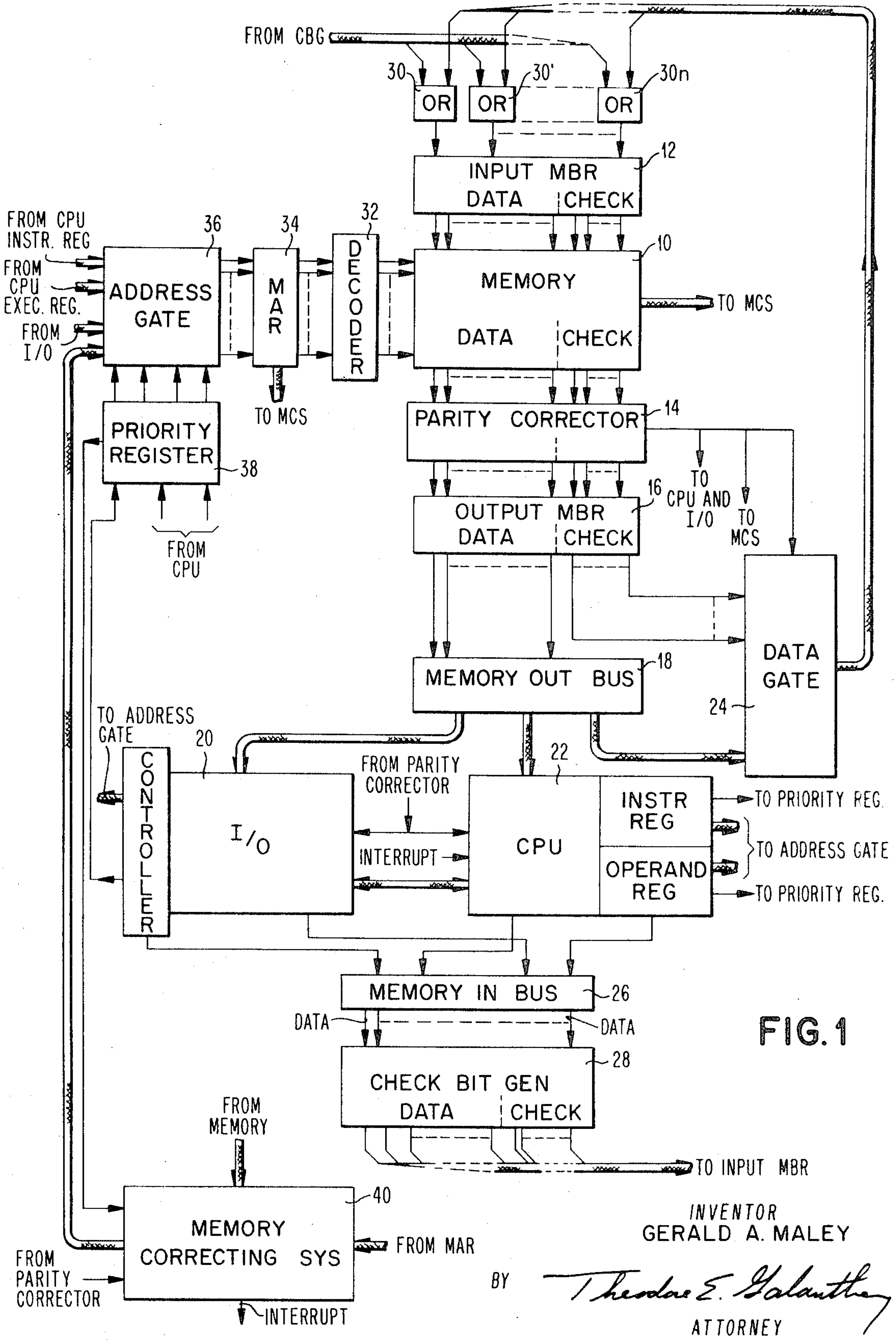
FIG. 1 is a simplified block diagram showing the memory correcting system in an electronic digital computer.

Refer now to FIG. 1 for a generalized block diagram of a computing system utilizing the memory-correcting system of this invention. For a detailed understanding of this invention, it is necessary to briefly set forth the environment in which it is intended to operate. The structure and operation of these circuits is well-known to those skilled in the electronic computer art and will, therefore, only be described to the extent necessary for the understanding of the present invention. The monolithic memory 10 receives data and check-bits from input memory buffer register (MBR) 12. The output of memory 10 is connected to parity corrector 14 which receives both the data and check bits from memory 10. If there is an error in the word read from memory, it is corrected by the parity corrector and inserted in the output memory buffer register (MBR) 16. The output of MBR 16 is connected to the memory out bus 18 and the data is made available, as required, at the inputs of any one of a number of I/O devices 20, CPU 22, and data gate 24. The I/O devices 20 and CPU 22 operate in their conventional and well-known manner. In order to insert data into memory 10 from either I/O devices 20 or CPU 22, the data is first connected to memory in bus 26, which is further connected to check-bit generator 28. It is to be noted that in the data flow path between output MBR 16 and check-bit generator 28, only data bits are connected without check-bits. As mentioned, the I/O devices 20, and CPU 22 operate on these data bits in their conventional manner. It is the function of check-bit generator 28 to generate check-bits on the data received at its input and to provide these check-bits together with the data through OR circuits 30, 30', etc. to input MBR 12.

OR circuits 30, etc. are shown connected between check-bit generator 28 and input MBR 12 to indicate that data and check-bits can be received by the input MBR 12 from either check-bit generator 28 or data gate 24. In the event that an error is detected by parity corrector 14, a signal so indicating is transmitted to the CPU 22 and/or I/O devices 20. Such a signal is handled differently by various systems. For example, some systems stop the clock when such a signal is received, while others would merely note the error and continue the data processing. A signal that an error was detected would also activate data gate 24 which receives databits from memory output bus 18 and check-bits from the output of MBR 16. The output of data gate 24 is connected to input MBR 12 through OR circuits 30, for inserting data and check-bits into monolithic memory 10.

Monolithic memory 10 is addressed through decoder 32, which receives the addresses from memory-address register MAR 34. Address gate 36 operates under the control of priority register 38 and receives addresses from all the various devices (C.P.U., I/O, M.C.S.) which would potentially address memory 10. Priority register 38 in turn, receives control signals from the CPU 22 and I/O devices 20. I/O devices 20 have been shown with a controller incorporated therein and it is well-known to utilize such control circuitry with I/O devices. CPU 22 has been shown with an instruction register and operand register incorporated therein and this is also well-known. I/O devices 20 and CPU 22 are shown with an interconnection therebetween representing various data and control lines as may be desired in an overall computing system configuration. These details do not materially affect the spirit and scope of the present invention.

In order to detect and correct errors in a monolithic memory 10 and maintain the healthy operation of such memory 10, memory-correcting system (M.C.S.) 40 is provided. It is the stated purpose of memory-correcting system (M.C.S.) 40 to monitor the general health of the memory 10, by systematically detecting and correcting errors. In its simplest conceptual form, memory-correcting system (M.C.S.) 40 includes a counter to systematically and sequentially address the memory 10 through MAR 34 at such times as memory 10 is otherwise not busy with the running program. In this way, M.C.S. 40 operates on a cycle-stealing basis. Accordingly, M.C.S. 40 receives an input from priority register 38 indicating that the memory is not being used by the main program, and that M.C.S. 40 should supply its next address to address gate 36. This signal, in turn, is passed through address gate 36, MAR 34, decoded in decoder 32 and thereby, addresses memory 10. As long as the memory is not being used by the main program, such sequential addressing continues. The addressing, for example, could read all words on the same monolithic chip consecutively. In the event that an error is detected by parity corrector 14, a signal so indicating is transmitted to M.C.S. 40 by the line connection between parity corrector 14 and M.C.S. 40. In such an error condition, the actual erroneous data is received by M.C.S. 40 via the connection indicated from memory 10. The address of this erroneous data is received via the connection from MAR 34. The erroneous data and its associated address are stored in M.C.S. 40.

In the event that memory 10 is being used by the main program, no memory addressing is done by M.C.S. 40. However, should an error be detected while the main program is running, that information is also received by M.C.S. 40 from parity corrector 14 in the same manner as just described. Similarly, the errored word and its associated address are received by M.C.S. 40 from memory 10 and MAR 34. Those skilled in the art will appreciate that the computing system described can be infinitely more sophisticated and has been intentionally over-simplified in order to clearly disclose the error-correcting concept.

Figures 2, 3:
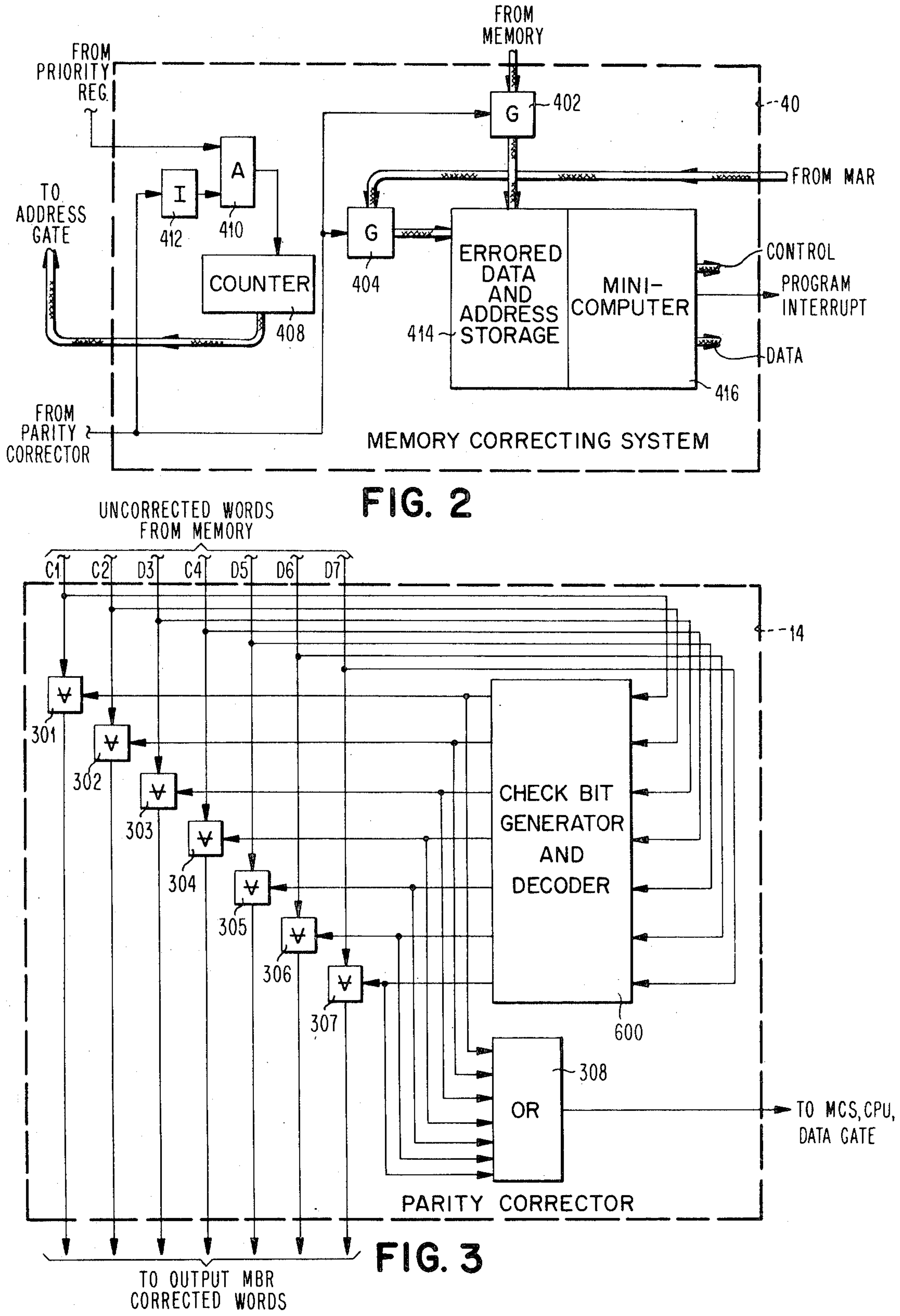
FIG. 2 is a more detailed block diagram of the memory correcting system.
FIG. 3 is a detailed block diagram of the parity corrector.

Refer now to FIG. 2 for an embodiment of the M.C.S. 40 in accordance with the present invention. Data (including check-bits) from memory 10 enters M.C.S. 40 through gate 402. Corresponding addresses are received from MAR 34 at gate 404. Gates 402 and 404 are normally closed since only errored data and addresses are entered into the memory correcting system. Gates 402 and 404 are therefore only opened in response to an error indication from parity corrector 14. In order for M.C.S. 40 to systematically interrogate the monolithic memory 10, counter 408 is provided. Counter 408 sequentially addresses the memory through address gate 36. In order for counter 408 to operate on a cycle-stealing basis and not be stepped during normal operation of the memory, counter 408 will only be stepped in response to signals from priority register 38 and parity corrector 14 through AND circuit 410 and invert circuit 412. Circuits 410 and 412 illustrate the concept that priority register 38 must indicate that a priority is available and parity corrector 14 must indicate that no parity error had to be corrected before AND circuit 410 will cause counter 408 to be stepped.

In order to record errored data and its corresponding address, errored data and address storage 414 is provided. Storage 414 can be any conventional storage means such as core storage, monolithic memory, or even magnetic tape, disk, or drum. Once the errored data and its corresponding address have been stored, a primary function of M.C.S. 40 has been completed. In order to have a more powerful correcting capability, however, mini-computer 416 is provided. Mini-computer 416 essentially exemplifies on-line diagnosis of the errored data and its corresponding address from storage 414. Depending on the degree of sophistication desired, mini-computer 416, can be a complete digital processor providing control and data signals to the main system for identifying, correcting and bypassing stuck bits etc. In a simple form, mini-computer 416 includes a counter for keeping track of the number umber of times a particular address fails, thereby identifying chronically errored addresses and determining whether particular chips and/or modules are completely in error. Control and data signals are provided to the main system for identifying and avoiding such faulty chips and modules. Mini-computer 416 also provides a program interrupt directly to CPU 22 in the event that the type of error diagnosed warrants it. The basic concept of the present invention is satisfied without detailed diagnosis by mini-computer 416 since the sophistication is limited only by the imagination of those skilled in the art.

As pointed out, data (including check bits) and its related address is stored in storage 414 only if it is in error and therefore gated through gates 402 and 404. In order to obtain a gating signal at gates 402 and 404, a means for detecting errored data and its corresponding address is provided in the form of parity corrector 14. With reference to FIG. 3, parity corrector 14 receives uncorrected words from memory 10 in the form of data bits and check bits. By way of example, assume a word including 4 data bits (D3, D5, D6 and D7) and three check bits (C1, C2 and C4). These uncorrected words are received into check bit generator and decoder 600 and each of exclusive OR circuits 301–307. The output of check bit generator and decoder 600 is supplied to exclusive OR circuits 301–307 and also to OR circuit 308. Check bit generator and decoder 600 (explained in greater detail later) provides an UP level output if any of the check bits or data bits are found to be in error. For example, if check bit C1 is in error, the input to exclusive OR circuit 301 from check bit generator and decoder 600 will be at an UP level. If check bit C2 is in error, the output of check bit generator and decoder 600 to exclusive OR circuit 302 will be UP, etc. Of course, if any of the check bits or data bits are in error, so that any of the inputs to OR circuit 308 are UP, then, a signal indicating an error will be provided to M.C.S. 40, CPU 22, and data gate 24. Exclusive OR circuits 301–307 operate in their conventional manner such that if both inputs are either at an UP level or a DOWN level, the output will be at a DOWN level. If the inputs are dissimilar, however (one UP and one DOWN), then the corresponding output will be at an UP level. Continuing with the assumption that an UP level indicates a "1" and a down level indicates a "0," then uncorrected words are corrected as follows. If one of the exclusive OR circuits receives a "0" and the "0" is correct, then the corresponding input from check bit generator and decoder 600 will also be "0" and a "0" will be transmitted to output MBR 16. Also, if a correct "1" is received into an exclusive OR circuit, then the other input to the exclusive OR circuit coming from check bit generator and decoder 600 is again "0" indicating that the " 1" is correct, and the correct "1" will be transmitted to output MBR 16. In the event, however, that an incorrect "0" is one of the inputs to one of the exclusive OR circuits, then a "1" will be received from check bit generator and decoder 600 causing a "1" to be transmitted to output MBR 16. Similarly, if an incorrect "1" is received into one of the exclusive OR circuits, the corresponding input from check bit generator and decoder 600 will also be a "1" causing a "0" to be passed on to output MBR 16. In this way, all bits (both check bits and data bits) are corrected in the parity corrector and an error signal is transmitted to the remainder of the system as indicated.

Figures 6, 7:
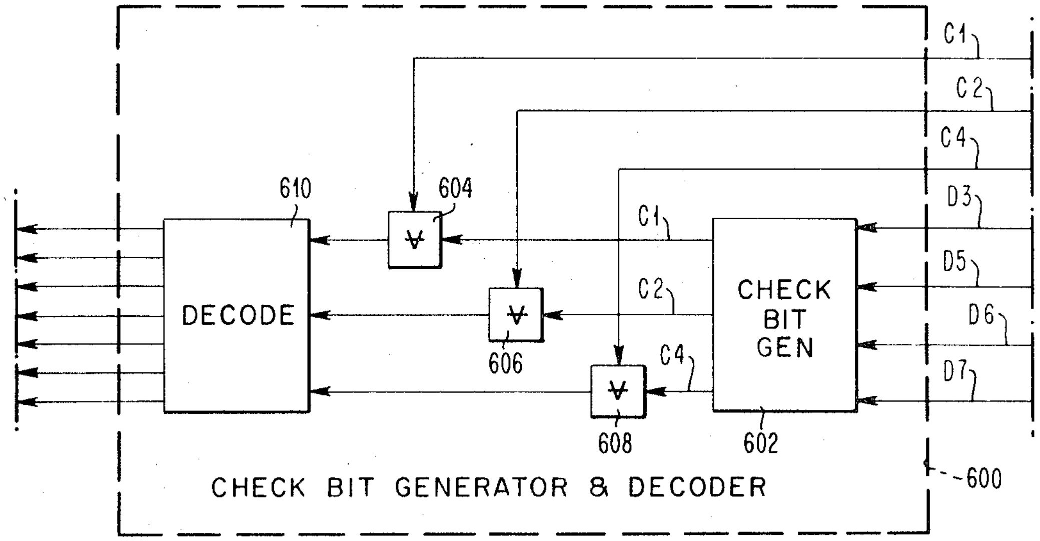
FIG. 6 is a detailed block diagram of the check bit generator and decoder used in the parity corrector.
FIG. 7 is an illustrative example of an errored word being corrected.

For further detail regarding the operation of check bit generator and decoder 600, refer to FIG. 6. Data bits are received into check bit generator 602 which is identical in structure and mode of operation to check bit generator 28 described in greater detail with reference to FIG. 4. Check bit generator 602 generates appropriate check bits in response to the particular data bits it receives. Therefore, check bits C1, C2, and C4 supplied by check bit generator 602 to exclusive OR circuits 604, 606 and 608 are correct so long as the data bit inputs are correct. The second input to each of the exclusive OR circuits are the check bits C1, C2 and C4, directly from memory 10. The exclusive OR circuits, of course, operate as previously described. Therefore, if the same input signal is received at both of the inputs of each of the exclusive OR circuits, then all three inputs to decode circuit 610 are being "0," the output on each of the seven output lines will also be "0." Decode circuit 610 operates as a standard binary decoder well known in the art.

Figure 4:
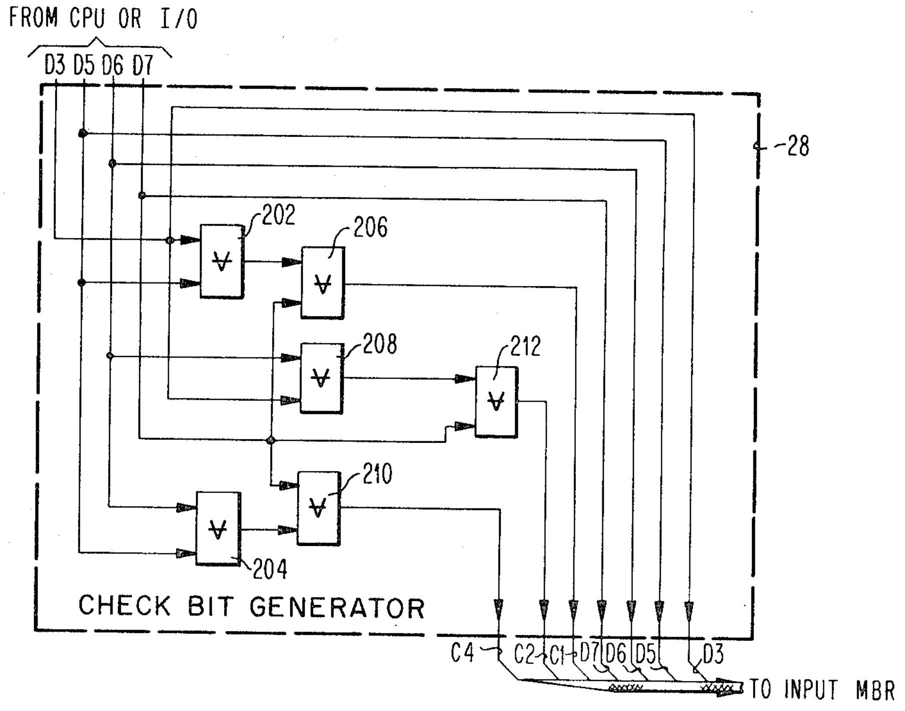
FIG. 4 is a detailed block diagram of the check bit generator.

By way of explaining the operation of check bit generator 602 in greater detail, refer to FIG. 4 which is a detailed circuit diagram of check bit generator 28, identical in every respect. Data bits only are received into the check bit generator which comprises the various exclusive OR circuits connected as shown. The exclusive OR circuits themselves operate in their conventional and well known manner. Check bits produced by this particular circuit are known as "Hamming bits" and the particular code employed herein is a Hamming code. For any given bit pattern on data input lines D3, D5, D6 and D7 there is produced a unique check bit pattern on check bit output lines C1, C2 and C4. Those familiar with Hamming codes will recognize the ability to expand this code to as many data bits and check bits as desired. Note that in this particular embodiment of the check bit generator, the data bits pass through unchanged.

Having described in greater detail the structure and operation of check bit generator and decoder 600, by way of FIGS. 4 and 6, refer also to FIG. 7 for a specific example. Assume, that a correct data word including check bits is: 0110011. Assume also, that this data word is received erroneously as: 0100011. In other words, the third bit is in error. Regenerating check bits in accordance with check bit generator 602 as described in greater detail in FIG. 4, results in C1 being a "1" while C2 and C4 are "0"'s. In the sample errored data word, however, C2 was a "1" while C1 and C4 were zeroes. Comparing the old check bits with the new check bits in exclusive OR circuits, 604, 606, and 608, the respective outputs will be 1, 1 and 0. This is the input provided to decode circuit 610. C4 is the highest level binary digit equivalent to the decimal 4; C2 is the next level binary digit equivalent to the decimal 2 while C1 is the lowest level binary digit equivalent to the decimal 1. It is well known that the binary number 011 is equal to the decimal number 3. The decode circuit output will therefore provide an indication that position three is in error by providing a "1" on the third line which is the data D3 bit. This means that exclusive OR circuit 303 will receive a "1" input while all other exclusive OR circuits receive a "0" input. Since the other input to exclusive OR circuit 303 is a "0," the output of exclusive OR circuit 303 will be a "1" (corrected). The complete output of parity corrector 14 to output MBR 16 will therefore be: 0110011 the corrected data word. If one were to count from right to left, then the errored bit would have been the fifth from the right (instead of third from the left) but the principle of correction would be the same.

The foregoing detailed description and specific example illustrate the operation of parity corrector 14 in providing corrected words to output MBR 16 and also providing a signal, indicating that an error has been detected, to M.C.S. 40, CPU 22, and data gate 24. The purpose of activating data gate 24 in the event an error is detected, of course, is to reinsert a corrected word into memory 10 instead of allowing the incorrect word to remain therein. The error signal from parity corrector 14 indicating that an error has been corrected is received in M.C.S. 40, at gates 402 and 404, gating the errored data word and its associated address into storage 414. The same error signal also inhibits the stepping of counter 408 through invert circuit 412 and AND circuit 410. Therefore, counter 408 will not be stepped when an error signal is received even though the priority register indicates that the memory is not otherwise busy.

Figure 5:
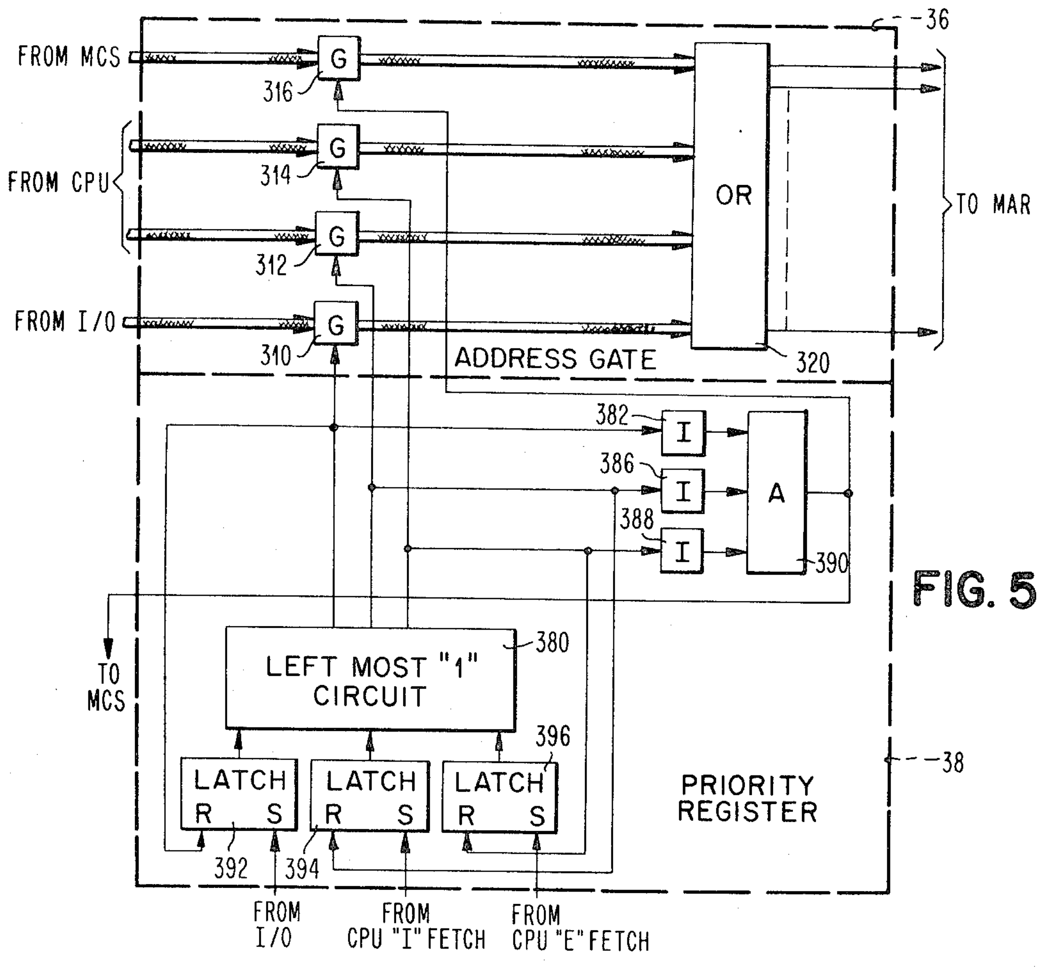
FIG. 5 is a detailed block diagram of the priority register and address gate.

By way of further example, assume now that the signal from the parity corrector indicates that the system is operating without error. In order for the M.C.S. 40 to present the next sequential address to address gate 408, counter 408 must begin to run. In order for counter 408 to be stepped a signal must also be received from priority register 38 enabling both inputs to AND circuit 410. In order to determine which one of the plurality of signal sources i.e., M.C.S. 40, the CPU 22, any one of I/O devices 20, is to address the monolithic memory 10 at a particular instant of time, priority register 38, illustrated in greater detail in FIG. 5, is provided. Address gate 36 operating in response to priority register 38 is also illustrated in FIG. 5. The particular order of priorities illustrated in FIG. 5 gives highest priority to the I/O circuits, second priority to CPU "I" fetch instructions, third priority to CPU "E" fetch signals and lowest priority to M.C.S. 40. In this way, M.C.S. 40 will not interfere with the normal operation of the system unless a grave error is detected in which case an interrupt signal is supplied directly to CPU 22. Control signals are received from the I/O into the set input of latch 392, and from the CPU at latch 394 and latch 396. Data signals from the I/O, CPU and M.C.S. 40 are received into gates 310, 312, 314, and 316, as shown. Data from one of these sources is gated through one of the said gates through OR circuit 320 to MAR 34. OR circuit 320 depicted schematically as a single large OR circuit is of cource connected such that all the bits from one of the sources is supplied in any given cycle so that the output is the particular Memory Address Register to MAR 34. In this regard, OR circuit 320 is similar in construction to OR circuits 30, 30', etc. illustrated at FIG. 1. Priority register 38 further includes Left Most "1" Circuit 380. The details of circuit 380 are well known and will be found in McGraw-Hill published book, "Planning a Computer System" by Buchholz: page 142. Left most "1" circuit 380 has the characteristic that it will pass an input from the left most latch providing a signal. Therefore, if an input signal is received from latch 392, gate 310 is activated regardless whether an input is received from any of the other latches. The latch 392 is then immediately reset so that left most "1" circuit 380 is then ready for an input from either latch 392 or one of the other latches. Again, the left most latch providing an input to left most "1" circuit 380, will activate its corresponding gate. Thus, if latch 392 does not provide an input to circuit 380 and latch 394 does, then gate 312 is opened. If none of the latches 392, 394, or 396 provides a signal to circuit 380, then all the outputs of circuit 380 are DOWN so that all the outputs of invert circuits 382, 386 and 388 are UP. This enables AND circuit 390 providing an enabling signal to AND circuit 410 in M.C.S. 40, causing counter 408 to provide the next address to gate 316 which will be received at MAR 34.

In conclusion, what has been described is a memory correcting system for systematically interrogating a monolithic memory on a cycle stealing basis and recording errored data and its corresponding addresses. Also disclosed is a capability to detect errors and correct same during normal operation of the memory. This basic concept can be obviously expanded with state of the art knowledge into elaborate means for diagnosing and correcting errors.

While the invention has been particularly shown and described with reference to a preferred embodiment, it will be understood by those skilled in the art that various changes in form and detail may be made therein without departing from the spirit and scope of the invention.

What is claimed is:

1. In a programmable electronic digital computer having a central processing unit operable in accordance with a main computer program, said central processing unit being electrically connectable to one or more input/output devices for transfer of digital signals, the combination comprising:

a priority circuit operatively associated with said central processing unit and said one or more input/output devices and responsive to control signals from said central processing unit and said one or more input/output devices, said priority circuit providing a priority gating signal indicative of which one of the input/output devices or central processing unit is to address the monolithic memory at a particular instant of time;

addressing means operatively associated with the priority circuit and responsive to the priority gating signal from the priority circuit, determining whether one of the input/output devices, or the central processing unit is to address the monolithic memory at a particular instant of time, said addressing means also being operatively associated with each of said one or more input/output devices and said central processing unit and responsive to an addressing signal when the priority circuit indicates a corresponding priority gating signal;

a monolithic memory operatively associated with said addressing means and responsive to address signals from said addressing means for transferring digital signals stored in the monolithic memory at a particular location indicated by the address signals;

a parity correcting circuit operatively associated with said monolithic memory and responsive to an output signal from said monolithic memory for determining the correctness of information including data bits and check bits read from the monolithic memory;

a memory correcting system operatively associated with the priority circuit and providing an address to the addressing means whenever the priority circuit determines that neither the central processing unit nor any of the one or more input/output devices is to address the monolithic memory at that particular instant of time, said memory correcting system being also operatively associated with the parity correcting circuit and receiving a signal from said parity correcting circuit whenever a parity error is corrected, said memory correcting system being also operatively associated with the monolithic memory and receiving and storing output signals from the monolithic memory whenever the parity correcting circuit indicates that a parity error is corrected.

2. Apparatus as in claim 1 in which the memory correcting system further comprises:

means responsive to the priority circuit for determining particular intervals of time when the monolithic memory is not busy; and means for sequentially addressing the monolithic memory during the said particular intervals of time.

3. Apparatus as in claim 2 in which the means for sequentially addressing the monolithic memory comprises:

an electronic counting circuit.

4. In an electronic digital computer having a central processing unit operable by a main program, one or more input/output devices electrically connectable to the central processing unit for transfer of digital signals including information and control signals, and having a monolithic memory with information and control inputs and outputs adapted to receive and provide digital signals including information and control signals from and to said central processing unit and said input/output devices, said monolithic memory adapted to store information signals from said central processing unit and said input/output devices and for providing said information signals at an information output when said monolithic memory receives control signals at its control input, priority circuit responsive to digital signals from said central processing unit and said one or more input/output devices for determining which one of said one or more input/output devices or said central processing unit is to address the monolithic memory, a parity correcting circuit responsive to an information output of the monolithic memory for detecting and correcting parity errors in said output signal, the improvement including a memory correcting system, the said memory correcting system comprising:

gating means responsive to the priority circuit for actuating means for sequentially addressing the monolithic memory whenever the priority circuit indicates that neither the central processing unit nor the one or more input devices is to address the monolithic memory;

means responsive to the parity correcting circuit for gating information from the monolithic memory and its corresponding address into the memory correcting system when the parity correcting circuit indicates that an error has been corrected;

means for storing errored data and its corresponding address; and means for diagnosing detected errors and for providing a program interrupt output to the central processing unit when the diagnosis indicates the need for such interruption.

5. A programmable electronic digital computer operable in accordance with a main computer program and having a central processing unit, at least one input/output device electrically connectable to said processing unit for transferring digital signals, and also having a monolithic memory for storing digital signals received from either said central processing unit or said at least one input/output device, said monolithic memory receiving digital signals to be stored from either said central processing unit or said at least one input/output device, said monolithic memory receiving control signals from an addressing means, said addressing means receiving signals from said central processing unit and from said at least one input/output device, said addressing means also receiving an input from a priority circuit said priority circuit receiving an input from said central processing unit and said at least one input/output device, the improvement comprising:

an error-detecting circuit receiving output information from said monolithic memory, for determining the correctness of said output information and for providing an error-indicating signal to a memory correcting system; and a memory correcting system receiving the output of said error detecting circuit, said memory correcting system also receiving the output of said monolithic memory, said memory correcting system also receiving an input from said addressing means, said memory correcting system providing an output to said addressing means for addressing said monolithic memory when the priority circuit indicates that neither the central processing unit nor the said at least one input/output device is providing a signal to said priority circuit.

6. Apparatus as in claim 5 wherein said memory correcting system further comprises:

recording means for recording the output signal from said monolithic memory and the address of said output signal from the addressing means when said error detecting circuit determines that an error has been detected.

7. Apparatus as in claim 6 wherein said memory correcting system includes gating means, said gating means receiving an output from said error detecting means and gating the output of said monolithic memory and the output from said addressing means into a recording means.

8. Apparatus as in claim 7 wherein said memory correcting system includes a mini-computer for analyzing the information stored in said recording means.

9. Apparatus as in claim 5 wherein said memory correcting system includes gating means for receiving an output from said priority circuit and for receiving an inverted output from said error detecting means, and for providing an output signal to a systematic addressing means whenever the priority circuit indicates that neither the central processing unit nor any other said input/output devices desires to address the monolithic memory and also the error detecting circuit indicates that no error was detected.

10. In an electronic digital computer having a central processing unit operable in accordance with a main computer program and having input/output devices electrically connectable to the central processing unit for insertion and extraction of digital signals including information and control signals, and having a monolithic memory with information and control inputs adapted to receive digital signals including information and control signals from said central processing unit and said input/output devices, the combination further comprising:

addressing means electrically connected to the control inputs of said monolithic memory for accessing a particular portion of said monolithic memory;

a priority circuit receiving an input from both said central processing unit and said input/output devices for providing an input to said addressing means, thereby determining whether said central processing unit or one of said input/output devices addresses the monolithic memory at a particular instant of time;

a parity correcting circuit for receiving output information from said monolithic memory and determining the correctness of said output information; and a memory correcting system receiving an input from the parity correcting circuit and also receiving an input from the monolithic memory;

said memory correcting system including means for recording the output of the monolithic memory and its address whenever the parity correcting circuit determines that the output of said monolithic memory is incorrect.

11. In an electronic digital computer having a central processing unit operable in accordance with a main computer program and having input/output devices electrically connectable to the central processing unit for transfer of digital signals including information and control signals, and having a monolithic memory with information and control inputs adapted to receive digital signals including information and control signals from said central processing unit and said input/output devices, with the combination further comprising:

addressing means electrically connected to the control input of said monolithic memory for accessing a particular portion of said monolithic memory;

a priority circuit receiving an input from said central processing unit and said input/output devices for providing an input to said addressing means, thereby determining whether said central processing unit or one of said input/output devices is to address the monolithic memory at a particular instant of time;

a memory correcting system operatively associated with said priority circuit and responsive to an output of said priority circuit indicating that neither the central processing unit nor the input/output devices are addressing the monolithic memory, said memory correcting system including means for systematically providing an input address to said addressing means so long as the priority circuit indicates that neither the central processing unit nor the input/output devices are addressing the monolithic memory.

12. In an electronic digital computer having a central processing unit operable in accordance with a main computer program and having input/output devices electrically connectable to the central processing unit for insertion and extraction of digital signals including information and control signals, and having a monolithic memory with information and control inputs adapted to receive digital signals including information and control signals from said central processing unit and said input/output devices, the combination further comprising:

addressing means electrically connected to the control input of said monolithic memory for accessing a particular portion of said monolithic memory;

a parity correcting circuit for receiving output information from said monolithic memory and determining the correctness of said output information; and a memory correcting system operatively associated with said parity correcting circuit and responsive to the output of said parity correcting circuit, said memory correcting system also operatively associated with the monolithic memory and responsive to said output information from said monolithic memory, said memory correcting system including recording means for recording said output information whenever said parity correcting circuit determines that said output information is incorrect.

13. Apparatus as in claim 12 wherein said addressing means comprises:

an address gate adapted to receive input signals from the central processing unit, from the input/output devices, from the memory correcting system, and from the priority circuit;

a memory address register responsive to said address gate and providing signals to said memory correcting system and a decoder:

the decoder being responsive to signals from said memory address register and providing an output to said monolithic memory.

14. In a programmable electronic digital computer having a central processing unit operable in accordance with a main computer program, said central processing unit being electrically connectable to one or more input/output devices for transfer of digital signals, the combination comprising:

a priority circuit operatively associated with said central processing unit and said one or more input/output devices and responsive to control signals from said central processing unit and said one or more input/output devices, said priority circuit providing a priority gating signal indicative of which one of the input/output devices or central processing unit is to address the monolithic memory at a particular instant of time;

addressing means operatively associated with the priority circuit and responsive to the priority gating signal from the priority circuit, determining whether one of the input/output devices, or the central processing unit is to address the monolithic memory at a particular instant of time, said addressing means also being operatively associated with each of said one or more input/output devices and said central processing unit and responsive to an addressing signal when the priority circuit indicates a corresponding priority gating signal;

a monolithic memory operatively associated with said addressing means and responsive to address signals from said addressing means for transferring digital signals stored in the monolithic memory at a particular location indicated by the address signals;

an error detecting circuit operatively associated with said monolithic memory and responsive to an output signal from said monolithic memory for determining the correctness of information including data bits and check bits read from the monolithic memory;

a memory correcting system operatively associated with the priority circuit and systematically providing an address to the addressing means whenever the priority circuit determines that neither the central processing unit nor any of the one or more input/output devices is to address the monolithic memory at that particular instant of time, said memory correcting system being also operatively associated with the error detecting circuit and receiving a signal from said error detecting circuit whenever an error is detected, said memory correcting system being also operatively associated with the monolithic memory and receiving and storing output signals from the monolithic memory whenever the error detecting circuit indicates that an error is detected.

15. In a programmable electronic digital computer having a central processing unit operable in accordance with a main computer program, said central processing unit being electrically connectable to one or more input/output devices for transfer of digital signals, the combination comprising:

a priority circuit operatively associated with said central processing unit and said one or more input/output devices and responsive to control signals from said central processing unit and said one or more input/output devices, said priority circuit providing a priority gating signal indicative of which one of the input/output devices or central processing unit is to address the monolithic memory at a particular instant of time;

addressing means operatively associated with the priority circuit and responsive to the priority gating signal from the priority circuit, determining whether one of the input/output devices, or the central processing unit is to address the monolithic memory at a particular instant of time, said addressing means also being operatively associated with each of said one or more input/output devices and said central processing unit and responsive to an addressing signal when the priority circuit indicates a corresponding priority gating signal;

a monolithic memory operatively associated with said addressing means and responsive to address signals from said addressing means for transferring digital signals stored in the monolithic memory at a particular location indicated by the address signals;

an error detecting circuit operatively associated with said monolithic memory and responsive to an output signal from said monolithic memory for determining the correctness of information including data bits and check bits read from the monolithic memory;

a memory correcting system operatively associated with the priority circuit and sequentially providing an address to the addressing means whenever the priority circuit determines that neither the central processing unit nor any of the one or more input/output devices is to address the monolithic memory at that particular instant of time, said memory correcting system being also operatively associated with the error detecting circuit and receiving a signal from said error detecting circuit whenever an error is detected, said memory correcting system being also operatively associated with the monolithic memory and receiving and storing output signals from the monolithic memory whenever the error detecting circuit indicates that an error is detected.

16. Apparatus as in claim 1 in which said monolithic memory is arranged on a plurality of semiconductor chips and modules and said memory correcting system operatively associated with the priority circuit systematically providing addresses to the addressing means such that addresses associated with individual chips and modules are accessed in sequence thereby readily identifying faulty ones of said plurality of semiconductor chips and modules.

17. Apparatus as in claim 1 wherein said addressing means comprises:

an address gate adapted to receive input signals from the central processing unit, from the input/output devices, from the memory correcting system, and from the priority circuit;

a memory address register responsive to said address gate and providing signals to said memory correcting system and a decoder:

the decoder being responsive to signals from said memory address register and providing an output to said monolithic memory.

18. In an electronic digital computer having a central processing unit operable by a main program, one or more input/output devices electrically connectable to the central processing unit for transfer of digital signals including information and control signals, and having a monolithic memory with information and control inputs and outputs adapted to receive and provide digital signals including information and control signals from and to said central processing unit and said input/output devices, said monolithic memory adapted to store information signals from said central processing unit and said input/output devices and for providing said information signals at an information output when said monolithic memory receives control signals at its control input, a priority circuit responsive to digital signals from said central processing unit and said one or more input/output devices for determining which one of said one or more input/output devices or said central processing unit is to address the monolithic memory, a parity correcting circuit responsive to an information output of the monolithic memory for detecting and correcting parity errors in said output signal, the improvement including a memory correcting system, the said memory correcting system comprising:

gating means responsive to the priority circuit for actuating means for systematically addressing the monolithic memory whenever the priority circuit indicates that neither the central processing unit nor the one or more input devices is to address the monolithic memory;

means responsive to the parity correcting circuit for gating information from the monolithic memory and its corresponding address into the memory correcting system when the parity correcting circuit indicates that an error has been corrected;

means for storing errored data and its corresponding address; and means for diagnosing detected errors and for providing a program interrupt output to the central processing unit when the diagnosis indicates the need for such interruption.

19. In a programmable electronic computer, the combination comprising:

a monolithic memory;

input means for transferring information signals into the said monolithic memory;

an error detecting means operatively associated with said monolithic memory and responsive to output information signals from said monolithic memory, for providing a signal indicative of an error to a memory correcting system;

said memory correcting system having an input responsive to said signal indicative of an error, said memory correcting system being also operatively associated with said monolithic memory and responsive to output information signals from said monolithic memory, said memory correcting system further having means for recording said output information signals in response to said signal indicative of an error.

20. Apparatus as in claim 19 in which said memory correcting system additionally includes means for systematically addressing said monolithic memory, the combination additionally comprising:

addressing means operatively associated with said memory correcting system and responsive to address signals from said systematic addressing means.

21. Apparatus as in claim 20 further comprising:

a priority circuit connected to said addressing means and providing a priority gating signal to said addressing means;

an input/output device connected to the input of said priority circuit for providing an input to said priority circuit when the input/output device desires access to the monolithic memory;

a central processing unit connected to an input of said priority circuit for providing an input signal to said priority circuit when the central processing unit desires access to the monolithic memory;

said addressing means being operatively associated with said input/output device and responsive to an address signal therefrom;

said addressing means being operatively associated with said central processing unit and responsive to an address signal therefrom;

said addressing means providing an address signal from said memory correcting system to said monolithic memory only when neither the input/output device nor said central processing unit desires access to the monolithic memory.

22. In an electronic digital computer having a central processing unit operable in accordance with a main computer program and having input/output devices electrically connectable to the central processing unit for transfer of digital signals including information and control signals, and having a monolithic memory with information and control inputs adapted to receive digital signals including information and control signals from said central processing unit and said input/output devices, said monolithic memory adapted to store information signals from said central processing unit and said input/output devices and for providing said information signals at its output when said monolithic memory receives control signals at its control inputs, the method comprising the steps of:

detecting errors in the information signals at the output of said monolithic memory;

providing an error-indicating signal to a memory correcting system when an error is detected;

providing the address of the errored data to the memory correcting system; and recording the errored data and its address.

23. In an electronic digital computer having a central processing unit operable in accordance with a main computer program and having input/output devices electrically connectable to the central processing unit for transfer of digital signals including information and control signals, and having a monolithic memory with information and control inputs adapted to receive digital signals including information and control signals from said central processing unit and said input/output devices, said monolithic memory adapted to store information signals from said central processing unit and said input/output devices and for providing said information signals at its output when said monolithic memory receives control signals at its control inputs, the method comprising the steps of:

establishing a priority basis on which the central processing unit and input/output devices address the monolithic memory;

providing a memory available signal to a memory correcting system when neither the central processing unit nor any of the input/output devices address the monolithic memory;

systematically addressing the monolithic memory during time intervals when memory available signals are provided.

24. Method as in claim 23 comprising the additional steps of:

detecting errors in the output of said monolithic memory; and recording said errored data and its associated address.

25. Method as in claim 23 in which the step of systematically addressing the monolithic memory is replaced by the step of:

sequentially addressing the memory.

26. Method as in claim 25 comprising the additional steps of:

detecting errors in the output of said monolithic memory; and recording said errored data and its associated address.

* * * * *